Feb. 13, 1968  W. T. RENTSCHLER  3,368,468
PHOTOGRAPHIC CAMERA WITH EXPOSURE METER HAVING COMPENSATING
CIRCUIT FOR USE IN MAKING BOTH AMBIENT LIGHT
EXPOSURES AND FLASH EXPOSURES
Filed May 25, 1965
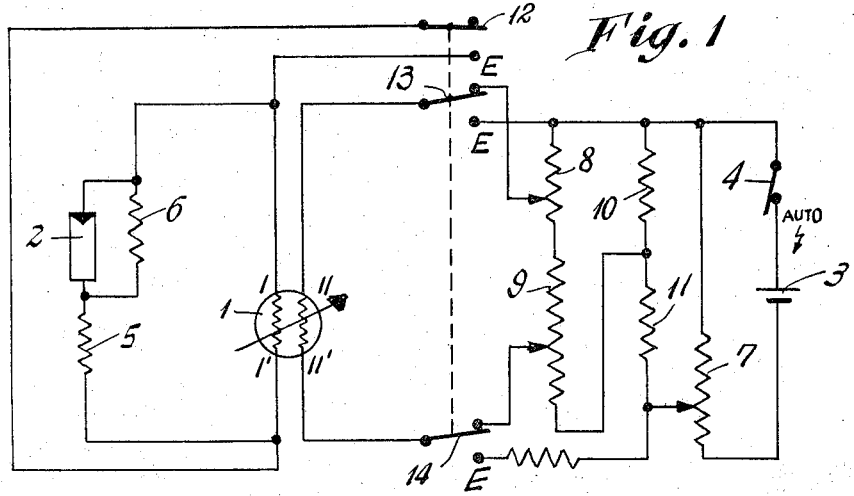
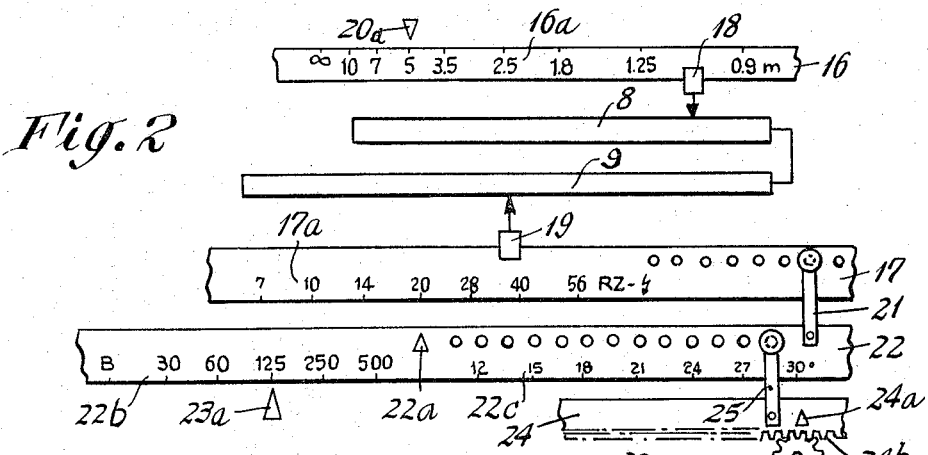
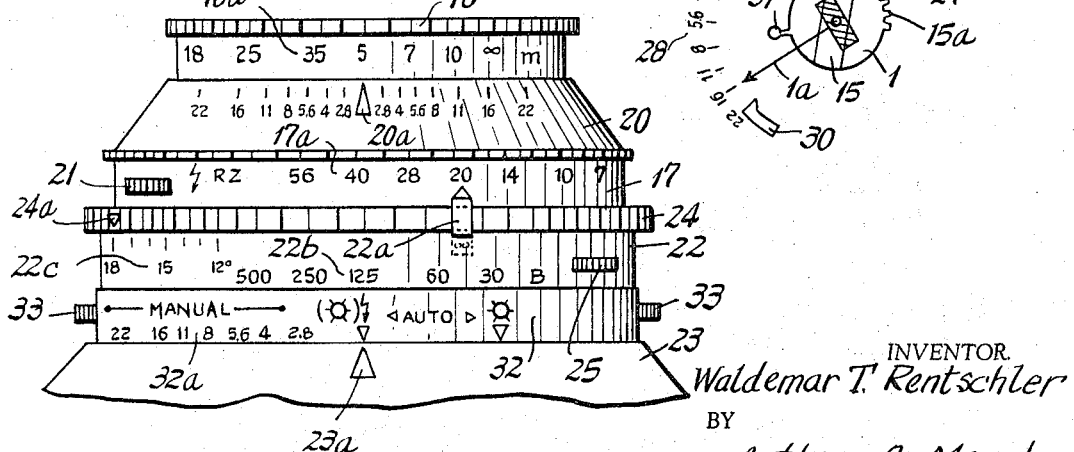
INVENTOR.
Waldemar T. Rentschler
BY
Arthur A. March
ATTORNEY

United States Patent Office 3,368,468
Patented Feb. 13, 1968

3,368,468
PHOTOGRAPHIC CAMERA WITH EXPOSURE METER HAVING COMPENSATING CIRCUIT FOR USE IN MAKING BOTH AMBIENT LIGHT EXPOSURES AND FLASH EXPOSURES
Waldemar T. Rentschler, Calmbach, Black Forest, Germany, assignor to Prontor-Werk Alfred Gauthier G.m.b.H., Calmbach (Enz), Germany, a corporation of Germany
Filed May 25, 1965, Ser. No. 458,585
Claims priority, application Germany, May 27, 1964, G 40,700
2 Claims. (Cl. 95—10)

The present invention relates to a photographic camera with an exposure meter having one winding connected to a photocell for indicating ambient light and a second winding connnected to a battery-powered compensating circuit to set the meter for making flash exposures.

There are known devices for automatically setting the diaphragm of a camera in making flash exposures and in such devices the diaphragm is set in response to the presetting of the guide number of the flash bulb or flash source and of the distance value. In such devices the diaphragm is set prior to the actual release of the shutter. However, these devices are always based on the assumption that the flash is the sole determining factor for the exposure of the photograph to be taken, that is, that there is no appreciable ambient light during the exposure. Exposures with mixed light, in which the ambient light, either daylight or a strong permanent artificial light, and light from a photo-flash are combined, continue to require complicated calculations when using the known devices.

Also known is a device in which mixed light exposures are made using automatic setting of the exposure time. Of decisive importance for the length of the exposure time is the light intensity of the scene to be photographed, that is, that light which is reflected by the object to be photographed and by its immediate environment and is absorbed by the photo electric measuring apparatus of the camera. In case a flash is used in addition to the daylight, the light density is greater, which permits a shorter exposure time. However, it is possible to take the flash portion of the exposure into consideration only if the scene to be photographed comprises comparatively large reflecting surfaces; usually this is the case only when, for example, photographs are taken in a room. But if flash exposures are made outdoors where there is usually no large reflective surface and where the flash mostly serves to brighten the shadows, the flash component is given no consideration or is given only an insufficient consideration.

It is the main object of the present invention to avoid the defects of the known devices for automatic exposure control so as to create an arrangement for a combined automatic daylight and flash system which is suited for cameras with exposure meter and moving-coil measuring mechanism and which can be used in present day cameras with automatic diaphragm systems.

To solve this problem, it is proposed in the present invention that the measuring mechanism of the exposure meter comprise two windings through which separate currents flow, and that one of the two windings be located in the circuit of a photocell or photo-sensitive resistance associated with the exposure meter, while the other one is connected in a circuit with a battery and adjustable resistors provided for the purpose of taking into account the intensity of flash sources and the focal setting of the camera. This makes it possible to obtain correctly exposed flash exposures both when the exposure is carried out entirely by photo-flash as well as when it is carried out with mixed light including some ambient light. It is thus unnecessary for the photographer to engage in any calculation; after he has preset the apparatus according to the intensity of the flash source being used, based either on the guide number or the index, it is merely necessary for him to set the focus control according to the distance from the camera to the object to be photographed. The apparatus then adjusts the shutter to set a correct diaphragm aperture size without any further work on the part of the photographer. This diaphragm setting is determined by the guide number equation and the intensity of the ambient light and takes into consideration all other presettings, such as film sensitivity and exposure time, or shutter speed. Regardless of whether a photo-flash bulb or an electronic flash source is used in making a flash exposure, the results will be equally good, since the reflected light of the flash source is taken into consideration by means of the intensity setting of the camera, which has to be made only once, and which does not require that the reflected light of the flash source be taken into consideration by photometric measurement during the exposure. Even when making exposure outdoors, it will be possible to obtain a correct exposure based upon the prevailing ambient light, since the measurement of the flash portion is obtained independently of the existence or nonexistence of reflecting surfaces.

The invention will be described in the following specification together with the drawings in which:

FIG. 1 is a schematic diagram of the complete circuit including one portion comprising a photocell and another portion comprising a battery as a source of current;

FIG. 2 is a diagrammatic view of one arrangement of the setting controls of a camera, which serve to carry out daylight exposures as well as to take into consideration the separate exposure factors when making flash exposures; and FIG. 3 is a view of an intra-lens shutter equipped with setting members according to FIG. 2.

For the purpose of explaining the invention the specification refers to a camera in which the diaphragm is set fully automatically after presetting the shutter speed and prior to actually making an exposure. The diaphragm is set by sensing the indicator of an exposure meter built into the camera case, both when making daylight exposures and when making exposures by photo-flash. Reference to a camera having a fully automatic diaphragm setting system does not mean that the invention cannot also be used in cameras having resetting devices associated with their exposure meters to permit the diaphragm to be set on a semiautomatic basis.

However, it is felt to be unnecessary to explain the operation of the invention in connection with a semiautomatic camera because the essential difference between a semiautomatic camera and a fully automatic camera consists in the fact that for fully automatic setting, the diaphragm lamellae are set in response to the actuation of the shutter release trigger while in cameras with semiautomatic operation the diaphragm is set manually by a mechanism which includes an indicator that must be aligned with a fixed mark. In addition, the invention is not limited to the type of camera having an exposure meter equipped with a measuring mechanism having a variable basic position for the purpose of making the setting on a basis of both exposure time and film sensitivity. On the contrary, the proposals set forth hereinafter can be accomplished in all rotating-coil measuring mechanisms for exposure meters. And specifically those in which the exposure time, or shutter speed, and film sensitivity are taken into consideration by changing or varying the resistors, by the shading of a photo-cell or of a photo-sensitive resistor, or by modifying the operation electrically.

The automatic setting mechanism of the present invention includes a measuring mechanism 1 of an exposure meter in a camera having two voltage sources, for example, a photocell 2 and a battery 3. Each of these voltage sources has its own circuit of which the measuring mechanism 1 is a part. As is apparent in the circuit of FIG. 1, the measuring mechanism is in the form of a double measuring mechanism, that is it is provided with a rotating coil which consists of one winding I–I' for the daylight circuit and another winding II–II' for the flash circuit. The measuring mechanism 1 includes a movable element illustrated by a diagonal line, the position of which is determined by the sum of the currents flowing in the two windings I–I' and II–II'. These currents may be considered to be the sums of currents due to the daylight portion of the circuit and the flash portion of the circuit. In the case of daylight exposures carried out with sufficient natural light, it is merely necessary that the photocell 2 be connected to the winding I–I'. On the other hand, if there is not sufficient ambient light to make a proper exposure, the battery 3 may be connected with the winding II–II' of the rotating coil of the measuring mechanism 1. As may be seen from the wiring diagram, a switch 4 is provided in series with the battery 3 to disconnect it when it is not needed. The switch 4 has an "AUTO" contact position indicated by a flash symbol. As soon as the movable contact of the switch 4 is in the "AUTO" position, the voltage of the battery 3 is applied to the measuring mechanism 1, which causes a magnetic field to be established in the winding II–II'. This field may be superimposed on a magnetic field due to current flowing in the winding I–I' but only if there is a corresponding daylight component of the light. The daylight component may sometimes be so small that the deflection of the measuring indicator 1a is due entirely to the current flowing in the winding II–II' of the rotating coil. The situation is different when the ambient component of the light is great enough to produce current in the winding I–I' whereby the total magnetic field due to a current in both of the windings I–I' and II–II' is effective to deflect the indicator. In that case, for mixed light, a single exposure value is established to insure the right exposure of the subject matter, and this single value is transmitted to the measuring mechanism 1.

The wiring diagram in FIG. 1 shows, in addition to the photocell 2, a resistor 5 in series therewith and a calibrating resistor 6 in parallel with the photocell to control the voltage relations. The circuit of the battery 3 includes a calibrating resistor 7 for the same purpose and two variable resistors 8 and 9, one of which serves to take into consideration the setting of the focus control of the camera in accordance with the distance to the object being photographed. The other one serves to take into consideration the intensity of the flash source being used for the particular photograph being taken. Preferably the two resistors 8 and 9 are in the form of potentiometers and are connected in series. Two resistors 10 and 11 are connected as a voltage divider ahead of the potentiometers 8 and 9 and the taps of the potentiometers are connected to the measuring mechanism 1 so that the latter also indicates a voltage which is the sum of two partial voltages obtained from the potentiometers 8 and 9. A three pole switch is connected to the circuits of the photocell 2 and of the battery 3 and comprises three movable contacts 12–14 mechanically connected together as indicated by the broken line. The calibration of the apparatus may be checked by moving the three arms 12–14 into contact with the terminals marked "E."

The potentiometers 8 and 9 are more specifically considered in connection with FIGS. 2 and 3. It may be seen in FIG. 2 that the potentiometer 8 is operatively associated with the focus control, or distance setting member, 16 which is used to focus the objective lens on whatever object is to be photographed. The potentiometer 9 is associated with a control, or setting member, 17 by means of which a specific value factor corresponding to the flash source may be taken into account. For this purpose sliding contacts 18 on potentiometer 8 and 19 on potentiometer 9 are connected to the focus control 16 and the second control, respectively. As illustrated in both FIGS. 2 and 3, the focus control 16 has a scale 16a which is set with respect to a fixed mark 20a arranged, for example, on the front plate 20 of a camera shutter. The control 17 may be connected to the shutter speed control, or the exposure time setting member, 22 in different relative positions by means of a releasable coupling handle 21. The control 17 has an index number scale 17a, which permits the control to be set with respect to a mark 22a on the shutter speed control in order to take into account the respective flash index value.

The expression "flash index" or "flash index number" generally means the guide number at a specific film sensitivity. For example it may be assumed, in the present embodiment, that the index corresponds to the guide number at 18°. The index is thus a single, invariable value for the intensity of the flash source. Instead of the index, a flash bulb type scale may be provided which contains, for example, the reference values PF1, PF5, XM1, XM5, etc. However, since flash bulbs of different intensity are marketed under the same trade names, it is not always satisfactory in practice to rely on this type of scale, but, instead it is better to use the index scale. If flash exposures are made using a flash source which may be either a flash bulb or an electronic flash which has, for example, the guide number "20" for a film sensitivity of 18°, the index setting member 17 will have to be set at the value "20." The intensity of the flash source used has thus been set on the camera once and for all, independently of different film sensitivities. This index will have to be changed only if a different flash source is used subsequently.

As is also apparent from FIG. 2 the shutter speed control 22 has in addition to the usual exposure time scale 22b, a film sensitivity scale 22c. The shutter speed scale 22b is set with respect to a fixed mark 23a, which is usually arranged on the camera tube 23, as shown in FIG. 3, while the film sensitivity is set by means of a setting member 24 which has a fixed mark 24a and which can be nonrotatably connected to the shutter speed control 22 in different relative positions by means of a releasable coupling handle 25.

The setting member 24 for adjusting the operation of the camera in accordance with the film sensitivity, has gear teeth 24b connected to a gear segment 15a by means of a set of gears indicated by pinions 26 and 27 and a dot-and-dash line. The segment 15a, in turn, is affixed to the base frame 15b of the measuring mechanism 1. In accordance with standard procedure, the setting of the mechanism for a particular film sensitivity and exposure time adjusts the basic position of the frame 15. This is the case, for example, in the majority of cameras with fully automatic or semi-automatic diaphragm operation, to which reference was made hereinabove. In such cameras a diaphragm aperture is set which properly takes into account the shutter speed and film sensitivity only if these factors have been applied to the measuring mechanism 1.

As may also be seen in FIG. 2, the rotating coil of the measuring mechanism 1 has an indicator 1a, which indicates values on a scale 28. These are diaphragm values between the extremes of "2.8" and "22" and connected to these extreme values is a warning field 29 or 30 which indicates, as soon as the pointer 1c enters the respective field, that the photographer can no longer expect to take usable photographs, either because of over-exposure or underexposure in view of the ambient light. Preferably the diaphragm scale 28, as well as the two warning fields 29 and 30, are located so that they become visible in a window or aperture of the camera housing or are mirrored into the view finder of the camera by means of prisms. A calibration mark 31 is located on the measuring mechanism to check the voltage conditions in the flash circuit.

As has been stated, FIG. 3 illustrates one embodiment of an intra-lens shutter. The arrangement of the individual controls, or setting members, coincides substantially with the diagrammatic view of FIG. 2 but differs slightly therefrom, in that the setting member 24 for film sensitivity is located between the flash index setting member 17 and the shutter speed control 22. The various components of FIG. 3 have the same reference numerals in FIG. 2. FIG. 3 also includes another control, or setting member, 32 for manually setting the diaphragm, and this control includes a diaphragm setting scale 32a provided with the additional expression "MANUAL" and two setting positions indicated by a flash symbol and by a sun symbol, respectively, which are labeled with the common expression "AUTO" and which indicate the settings for automatic daylight and for flash operation.

The control 32 in FIG. 3 is shown with the automatic flash system in operation, as indicated by the location of the "AUTO" setting mark with the flash symbol and the sun symbol in brackets opposite the fixed mark 23a. In order to simplify the handling of the control 32, finger pieces 33 are provided at diametrically opposite points on the control 32. In addition, certain well known means are associated with the control 32, such as a cam (not shown), as well as transmission members cooperating therewith, to provide means for adjusting the diaphragm when the control 32 is in the "MANUAL" setting range. Furthermore, an operative connection exists between the control 32 and the switch 4, since the switch must be actuated in response to movement of the control 32 from the automatic daylight position to the automatic flash setting, and vice versa.

It is apparent from FIG. 2 that there is an operative connection in the form of a series of gears including the pinions 26 and 27 between the measuring mechanism 1 and the setting member 24 for film sensitivity, as well as the shutter speed control 22. The shutter speed control 22 is also arranged so that it can be coupled in different relative positions to the film sensitivity setting member 24. The transmission path including the pinions 26 and 27 is effective in both the automatic daylight setting of the diaphragm control 32 and in the automatic flash setting position. Therefore, even when flash exposures are to be made, the measuring mechanism 1 is rotated, when two of the interconnected setting members, i.e., the shutter speed control 22 and the film sensitivity setting member 24, are rotated, to the same extent as when daylight exposures are being made. This, in turn, causes the base from 15 of the measuring mechanism 1 to be subjected to a change of position both when the shutter speed is set and when the film sensitivity is set. However, since a change of the exposure time does not cause a change in the blackening of the negative in case of flash exposures unless there is an appreciable ambient light, and since it may be possible to select exposure times shorter than 1/30 second in case of flash exposures, the invention provides that the potentiometer 9 associated with the shutter speed control 22 be made in the form of an adjustable resistor by means of which the rotation of the measuring mechanism caused by a change of position of the shutter speed control is electrically compensated. Thus a change of position of the measuring mechanism indicator 1a with respect to the fixed diaphragm scale 28, resulting from the rotation of the measuring mechanism 1, is compensated, or annulled, electrically and in such a way that a change of the voltage condition in the circuit of the measuring mechanism 1 is accomplished by the potentiometer 9 in positive response to the setting motion of the shutter speed control 22. The voltage applied to the measuring mechanism prior to the change of position of the shutter speed control 22 is either increased or decreased in proportion to the setting motion of the shutter speed control or to the rotary motion of the measuring mechanism 1. However, the compensation of the rotation of the measuring mechanism 1 applies only to a change of position of the shutter speed control 22, while the rotation of the measuring mechanism caused by a change of the film sensitivity setting changes the position of the measuring mechanism indicator 1a and thus has an effect, ultimately, on the automatic diaphragm setting. The potentiometer 9 designed to take into consideration the intensity of the flash source is adjustable with respect to a scale such as the scale 17a which indicates the intensity of the flash source in values that are valid for a specific film sensitivity.

The operation of the camera with automatic daylight and automatic photo-flash systems in their respective work ranges will now be explained briefly.

*Operation of the automatic daylight setting system*

In order to make exposures with automatic setting of the diaphragm in response to the ambient light, a specific shutter speed must first be selected whereupon the diaphragm control 32 must be moved into its "AUTO" setting position indicated by the sun symbol. In this position the switch 4 is open so that the movable contact of the switch is away from the "AUTO-FLASH" contact. In this case, the measuring mechanism 1 receives current only from the photocell 2, and this current causes a specific deflection of the indicator 1a of the measuring mechanism.

*Automatic flash system*

In order to make flash exposures, the diaphragm control 32 must be moved to the "AUTO" setting position provided with the flash symbol. As shown in FIG. 1, the movable contact of the switch 4 is brought into connection with the contact identified as "AUTO-FLASH." Moreover, before making the exposure, the shutter speed control 22 must be set at a specific exposure time. In the case of flash exposures, the time to be selected would normally be 1/30 second whereas any other short exposure time, including, for example, 1/500 second may be set for electronic flash exposures. Depending on the position of the tap of the potentiometer 9 and on the setting of the potentiometer 8, which is adjusted by means of the focus control, a magnetic field of specific magnitude is built up in the windings II–II' of the measuring mechanism 1. The effect of this magnetic field can be increased by that of the field produced by the winding I–I' if the ambient light is of sufficient intensity to cause the photocell 2 to supply current to the winding I–I'. The position of the measuring mechanism 1a is sensed in the customary manner of automatically controlled cameras so that when the shutter release is actuated, the diaphragm of the camera is automatically set to the proper value.

*Manual setting*

In order to set the camera entirely manually, the control 32 must be moved to a position in which one of the values of the diaphragm scale 32a is placed opposite the fixed mark 23a. After the shutter speed control has been set and the focus control has been adjusted, the shutter can be actuated in the usual way.

What is claimed is:
1. In a photographic camera, a focus control; a diaphragm setting mechanism comprising: an exposure meter comprising a first winding and a second winding, a photosensitive device connected to one of said windings to control the current therethrough in response to ambient light and a battery circuit comprising a battery and ad- justable resistance means adapted to control current from said battery in said second winding in accordance with the intensity of flash sources and the setting of said focus control of the camera.

2. The camera of claim 1 in which said resistance means comprises a pair of potentiometers, one of said potentiometers being mechanically connected to said focus control to be operated thereby and the other of said potentiometers being separately adjustable.

References Cited

UNITED STATES PATENTS 2,943,545  7/1960  Fahlenberg _____ 95—64 XR
2,978,970  4/1961  Fahlenberg _____ 95—10 XR NORTON ANSHER, *Primary Examiner.*

J. F. PETERS, *Assistant Examiner.*